United States Patent [19]

Vallejos

[11] 4,078,450
[45] Mar. 14, 1978

[54] APPARATUS FOR SHOCK MOUNTING OF PISTON RODS IN INTERNAL COMBUSTION ENGINES AND THE LIKE

[75] Inventor: Tony E. Vallejos, Paramount, Calif.

[73] Assignee: Alto Automotive Inc., Deerfield, Ill.

[21] Appl. No.: 723,095

[22] Filed: Sep. 14, 1976

Related U.S. Application Data

[63] Continuation-in-part of Ser. No. 578,805, May 19, 1975, Pat. No. 3,985,114.

[51] Int. Cl.² .......................... F02B 75/32; F16J 1/10; F01B 11/02; G05G 1/00
[52] U.S. Cl. .................... 74/581; 123/48 B; 123/78 E; 123/78 B; 123/197 AC; 92/84; 92/85 A
[58] Field of Search ............... 123/48 R, 48 B, 193 P, 123/193 CP, 78 R, 78 A, 78 B, 78 BA, 78 AL, 78 AA, 78 E, 78 C, 78 F, 197 AC; 92/84, 85 R, 85 A; 74/581, 582

[56] References Cited

U.S. PATENT DOCUMENTS

| 1,406,886 | 2/1922 | Nuta | 123/78 E |
| 1,875,180 | 8/1932 | Rider | 123/78 E |
| 2,217,721 | 10/1940 | Anthony | 123/78 E |
| 3,985,114 | 10/1976 | Vallejos | 92/84 X |

Primary Examiner—Samuel Scott
Assistant Examiner—Don E. Ferrell
Attorney, Agent, or Firm—Garrettson Ellis

[57] ABSTRACT

An engine is disclosed having at least one piston in operative connection with a crankshaft. A bearing member which defines an elongated, curved bearing surface, is pivotally attached at one end to an eccentrically-mounted member on the crankshaft. The bearing surface of the bearing member is positioned to be intermittently in power-transmitting, sliding relationship with a connection to the piston such as a piston rod. The bearing member is adapted to be rotatable about said pivotal attachment, for transverse displacement by the piston rod relative to the crankshaft, to absorb any shock generated against the piston and the crankshaft, such as by "engine knock." The bearing member is also adapted to return to its pre-displacement position after absorbing the shock.

16 Claims, 9 Drawing Figures

APPARATUS FOR SHOCK MOUNTING OF PISTON RODS IN INTERNAL COMBUSTION ENGINES AND THE LIKE

CROSS-REFERENCE TO RELATED APPLICATION

This application is a continuation-in-part of U.S. patent application Ser. No. 578,805, filed on May 19, 1975, now U.S. Pat. No. 3,985,114.

BACKGROUND OF THE INVENTION

In the parent application Serial No. 578,805 cited above, an apparatus is disclosed for the shock mounting of piston rods in internal combustion engines of one or more pistons and cylinders in power-conveying relationship with a crankshaft. As disclosed therein, an eccentrically-mounted member such as a pair of discs, transversely mounted on a crankshaft, carries a bearing member having a curved periphery that is positioned to be in sliding contact with a bearing shoe on the end of the piston rod, or other power-transmitting connection means with the piston.

Accordingly, and in a manner similar in certain limited aspects to the structure of Dasset U.S. patent No. 2,006,498, the reciprocating piston rod slides against the bearing member and other structure carried by the eccentrically-mounted member, forcing the crankshaft to rotate, exerting torque on the crankshaft through the eccentrically-mounted member.

The eccentrically-mounted member and bearing member are retained in a cage structure which is carried by the piston rod, in sliding relation thereto, to facilitate the transmission of power from the piston and piston rod to the crankshaft.

Upon the generation of shock through knocking or the like, a large portion of the shock can be dissipated without subjecting the crankshaft to its full force, since the bearing member against which the piston rod slidingly presses during the power stroke of the engine cycle is inwardly displaceable toward the center of rotation of the crankshaft, but is biased outwardly toward its radially outwardmost, position, so that energy is absorbed as the bearing member is displaced inwardly by the piston rod.

Accordingly, since the damaging effects of engine knock are reduced by the use of the bearing member, higher compression levels can be utilized in the engine for greater efficiency, utilizing lower octane fuel with reduced levels of lead fuel additives and the like.

Also, in engines utilizing the invention of the parent application Ser. No. 578,805, the ignition spark in the cylinders may be advanced to or before the top dead center position at low engine speeds, rather than its usual position of about 30° after top dead center position, for greater engine efficiency, since the danger of damage to the engine from preignition or knocking is greatly reduced.

Furthermore, engines utilizing the aforesaid invention can operate at fewer revolutions per minute without the danger of bad effects from knocking or "lugging," which is the laboring of an engine operating at an undesirably low speed under too heavy a load or too high a gear ratio.

Likewise, it is believed that the aforesaid invention can be utilized to reduce both hydrocarbon and nitrogen oxide emissions: the hydrocarbon emissions because an earlier ignition spark in the engine cycle and a lower engine speed will tend to lengthen the burning time and thus reduce the amount of unburned hydrocarbons; the nitrogen oxide emissions because at the time of maximum compression immediately after the ignition of a spark in the engine cycle, when the piston and piston rod are able to displace the bearing member of this invention, the cylinder chamber volume is quickly increased, with the consequent reduction in the temperature of the gases in the cylinder.

The invention of this present application constitutes an improvement upon the invention of the parent application Ser. No. 578,805, providing means for obtaining the advantages of the previous invention in a smaller, simpler structure, in which, unlike the disclosure of the parent application, the eccentric members do not move from side to side as they rotate, but reciprocate in a linear manner upwardly and downwardly, following the linear reciprocating motion of the piston rod.

Other improvements and advantages of the invention of this application will be apparent from the description below.

DESCRIPTION OF THE INVENTION

In accordance with this invention, an engine is disclosed having piston means reciprocable in cylinder chamber means. A crankshaft is adapted for power-conveying rotation with power-transmitting connection means including, for example, a piston rod, provided for communication between the piston means and the crankshaft. An eccentrically-mounted member is mounted on the crankshaft in transverse relation thereto.

In accordance with this invention, a bearing member is pivotally attached to the eccentrically-mounted member, the bearing member defining an elongated, curved bearing surface which is positioned for sliding, power-transmitting contact with the piston rod or other power-transmitting connection means. Accordingly, when shock is generated through the power-transmitting connection means, the bearing member can be displaced by pivotal motion to absorb the shock.

The bearing member is adapted by spring means, and/or its natural tendency to be biased outwardly during rotation of the crankshaft, to return to its pre-displaced position after absorption of the shock.

The bearing member is typically an elongated, curved structure which is pivotally attached to the eccentrically-mounted member adjacent one end of the bearing member. This change in shape of the bearing member, and the use of a pivotal attachment means, is a significant factor in the permitting the design of a small, more compact engine, but which still achieves the advantages of the previous application Ser. No. 578,805.

The eccentrically-mounted member carries compression cam means, adapted to periodically engage the power-transmitting connection means as the crankshaft and eccentrically-mounted member rotate: specifically during these portions of the cycle when the piston is to be pushed into the cylinder, i.e. the compression and the exhaust strokes. The compression cam is particularly useful during the compression stroke, since it provides a rigid, piston-advancing means so that the desired compression in the cylinder can be achieved.

The cam means is adapted to be periodically spaced from the connection means during other portions of the engine cycle, specifically the combustion phase, as well as generally the intake phase of the cycle, when the piston is moving out of the cylinder. Thus, free of restraint by the cam means, the piston and power-transmitting connection means are capable of displacing the bearing member as described above.

As another advantage of the invention of this application, the eccentrically-mounted member is freely-rotatably mounted on the crankshaft.

The eccentrically-mounted member and the bearing member carried by it are enclosed in tubular retainer means, and are capable of rotation inside the retainer means, with the retainer means and the eccentrically-mounted members being positioned in generally co-axial relationship. Accordingly, as an effect of this, when the crankshaft is rotated in one direction by operation of the piston rod pressing against the bearing member, the eccentrically-mounted member counterrotates about the crankshaft in a direction of rotation opposite to that of the crankshaft. The effect of this is that the transverse tubular retainer means can reciprocate in linear manner upwardly and downwardly with the piston rod, with the counterrotating crankshaft and eccentric member operating inside of the tubular retainer means. Accordingly, power is conveyed to the crankshaft from the piston by linear reciprocation, without the side-to-side rotation of the rigidly mounted eccentric members as in previous embodiments.

The tubular retainer means further defines a transverse tubular sleeve communicating with the interior of the tubular retainer means, through which the piston rod can pass to be in sliding, power-transmitting rotational contact with the bearing member and compression cam means.

Figure 1:
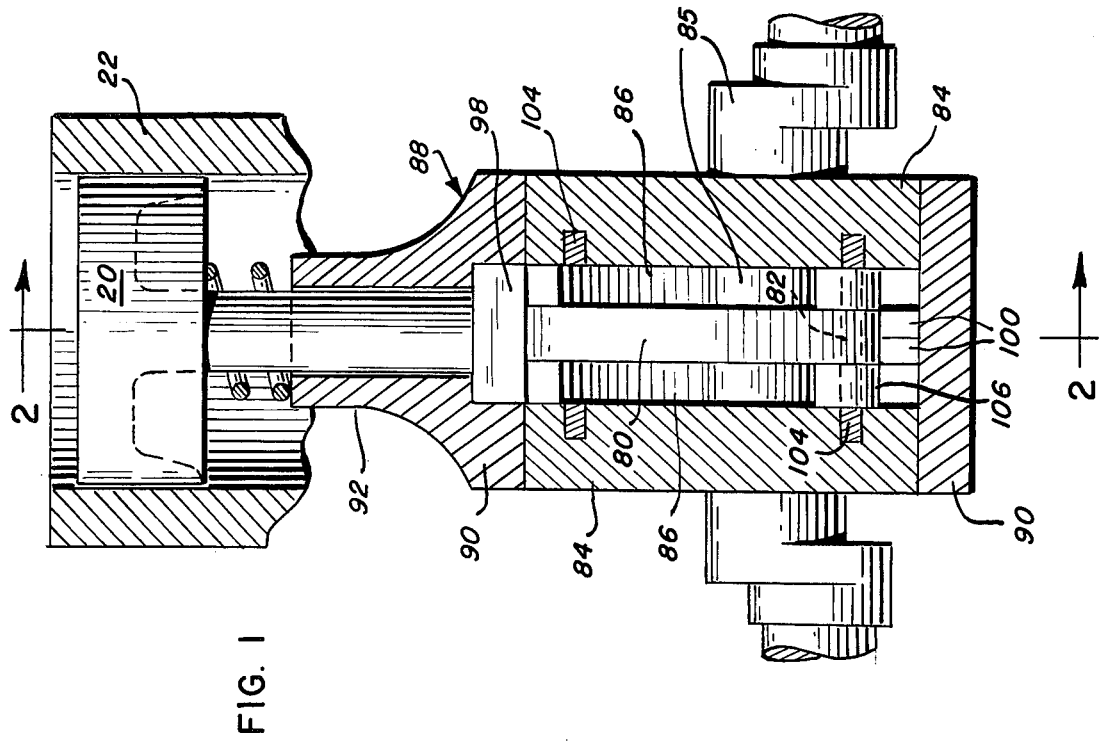
FIG. 1 is an elevational view, with some parts in section and broken away, of a portion of a crankshaft and a portion of a piston and cylinder arrangement in an internal combustion engine, illustrating an embodiment of the invention of this application in top dead center position.
Figure 2:
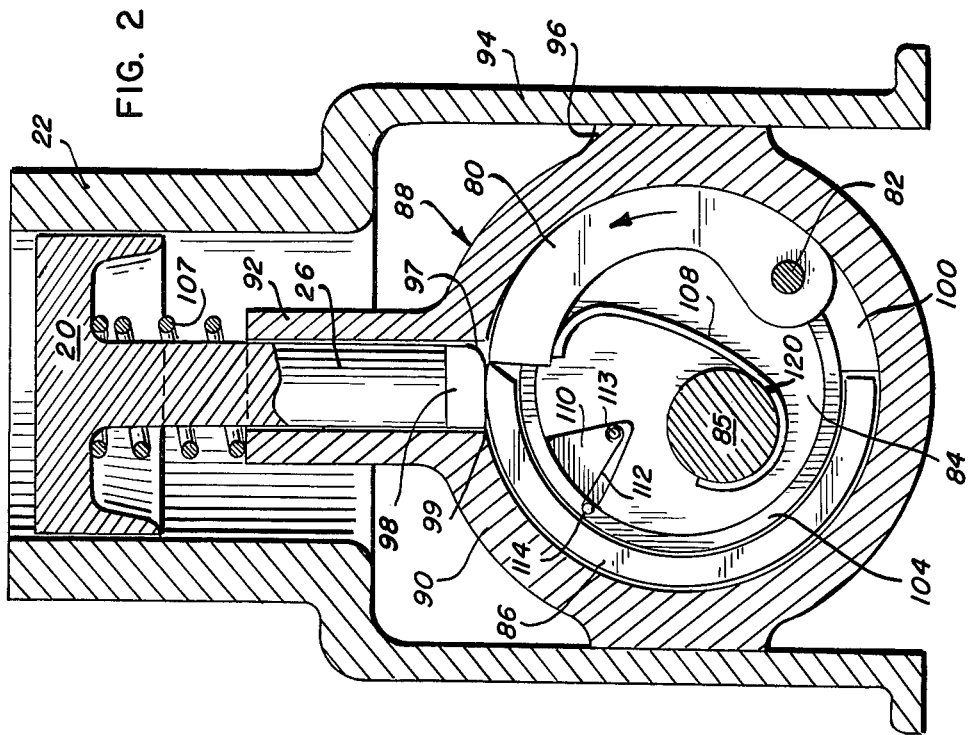
FIG. 2 is a vertical sectional view, taken along line 2—2 of FIG. 1, showing the device of this invention at the end of the compression phase of the engine cycle, just prior to the piston entering top dead center position.
Figure 3:
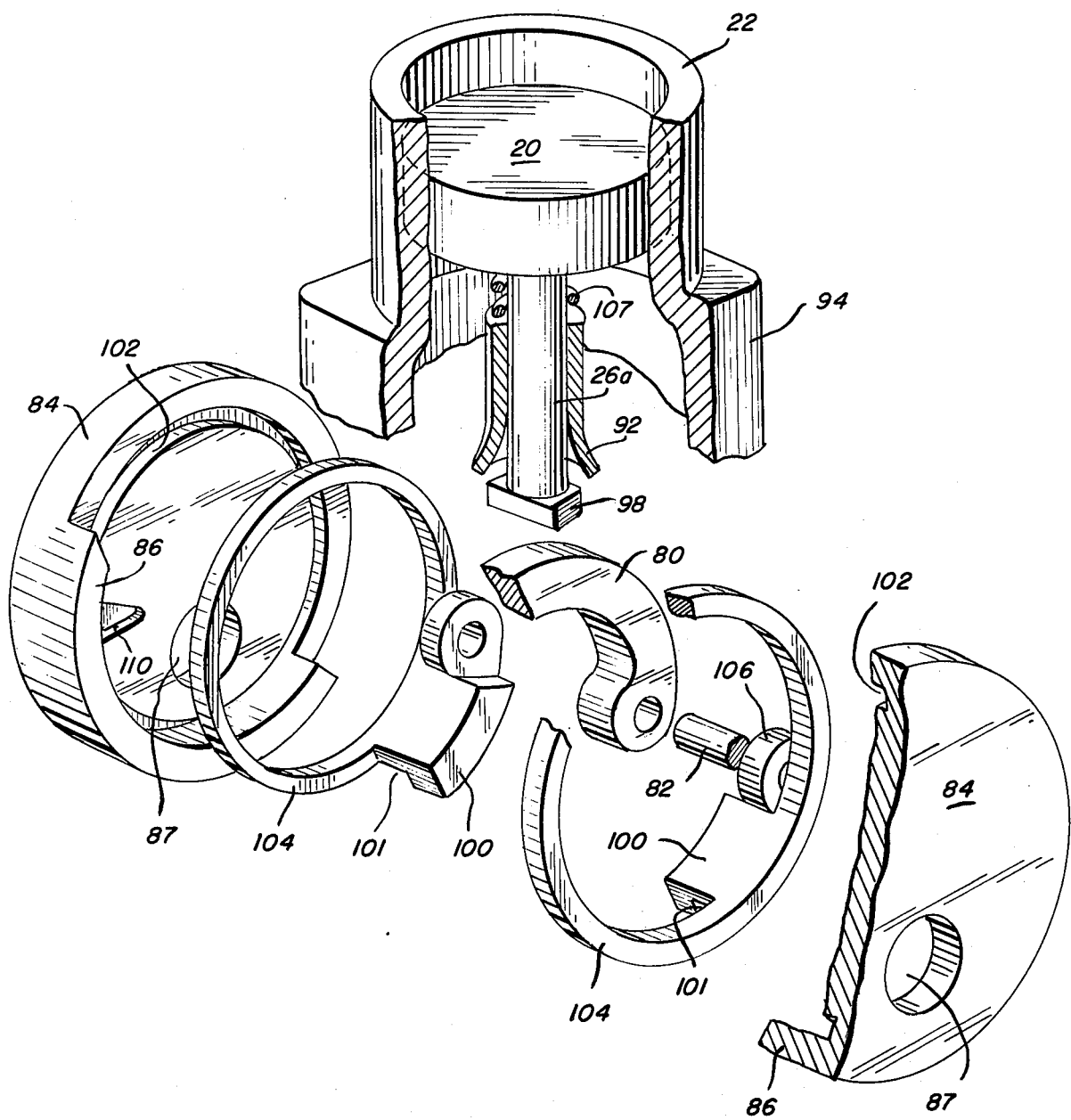
FIG. 3 is an exploded, perspective view of various parts shown assembled in FIGS. 1 and 2.

Referring now to FIGS. 1 through 3, an embodiment of a single cylinder using the present invention is illustrated. Other cylinders in the engine may utilize similar structure.

The structure shown is specifically adapted as a four-cycle gasoline engine of conventional design but for that described herein, but it is contemplated that this invention can also be adapted for use with other types of engines, such as diesel engines.

As illustrated in FIGS. 1 through 3, the bearing member 80 is, in this embodiment, an elongated, curved structure which is pivotally attached at one end thereof to a pin 82, which is attached to a pair of eccentrically-mounted members 84, which bracket elongated, curved bearing member 80. Compression cams 86 are carried by eccentrically-mounted members 84, and may be made an integral part of members 84, as shown in FIG. 3.

Eccentrically-mounted members 84 are mounted on a conventional crankshaft 85, which passes through apertures 87 in members 84. Members 84 are adapted by the size of apertures 87 or otherwise to be freely rotatable about crankshaft 85.

Eccentrically-mounted members 84 are positioned in a cage member 88, comprising a generally tubular retainer structure 90, closely enclosing the eccentrically-mounted members 84 and bearing member 80 and generally co-axial with members 84. Cage member 88 also includes a transverse, tubular aperture 92 for receiving a piston rod 26, connected to piston 20, which reciprocates back and forth within conventional combustion cylinder means 22.

Cage member 88 can reciprocate back and forth in housing 94 with piston rod 26, being appropriately positioned in housing 94 by sliding members 96 on the exterior of the tubular cage member 88.

A bearing shoe 98 is provided on the end of piston rod 26 for sliding, power-transmitting contact with the compression cam 86 and bearing member 80. Shoe 98 defines a rounded corner portion 97 on one side, to strengthen the shoe when in the configuration of FIG. 7, and an outwardly extending portion 99 on its other side, for improved operation.

Each eccentrically-mounted member defines an annular slot 102 (FIG. 3), which carries ring member 104. Ring member 104, in turn, carries a sleeve 106 for receiving pin 82, for attaching bearing member 80 to the eccentrically-mounted members 84 through ring member 104. Ring member 104 is capable of rotation in slot 102, to participate in the energy-absorbing displacement of bearing member 80.

Protrusion 100, defining slot 101, is also carried by ring member 104.

Spring means 107 is shown to be positioned between the back face of piston 20 and transverse tubular sleeve 92, to resiliently bias the piston and cage member 88 apart. Spring member 108 is provided to resiliently bias bearing member 80 into its radially outward position, as shown in FIG. 2.

Each eccentrically-mounted member 84 defines a recessed portion 110 containing a spring member 112 attached to member 84 at one end 113, which bears against a pin 114 positioned on ring member 104. The purpose of this is to resiliently resist clockwise rotation (or counterclockwise, as desired) of ring member 104 as bearing member 80 is resiliently absorbing shock force from piston 20, and to rotate ring member 104 back in a counterclockwise direction to its original position after such shock force has been dissipated. It is also contemplated that other structure can be utilized for the same purpose.

As the crankshaft 85 rotates clockwise in the operation of this invention, eccentric members 86 and their related parts correspondingly rotate in the opposite direction about center of rotation 120 being retained by retainer 88, so that the entire system of piston 20 and cage member 88 reciprocates upwardly and downwardly in a linear manner. This counterrotating characteristic of the eccentrically-mounted members 84 takes place spontaneously when the members 84 are free to rotate about crankshaft 86, and are held by cage member 88 and retainer 94 so that the only available motion is linear reciprocating motion. This eliminates the characteristic in which the eccentric members in their cage not only reciprocate upwardly and downwardly but reciprocate from side-to-side during their operation. Accordingly, engines utilizing this present embodiment can be manufactured to be of much smaller size. A wrist pin is unnecessary to connect piston 26 with piston 20, since the reciprocating motion is linear.

Referring to the functioning of this present embodiment, FIG. 2 shows the crankshaft 85 in the process of rotating counterclockwise to move piston 20 into top dead center position in the compression phase of the engine cycle. Compression cams 86 are, as the eccentric members 84 rotate, about to clear bearing shoe 98, to permit displacement of bearing member 80 by the piston rod in the event of an engine detonation, a preignition, or the like.

Figure 4:
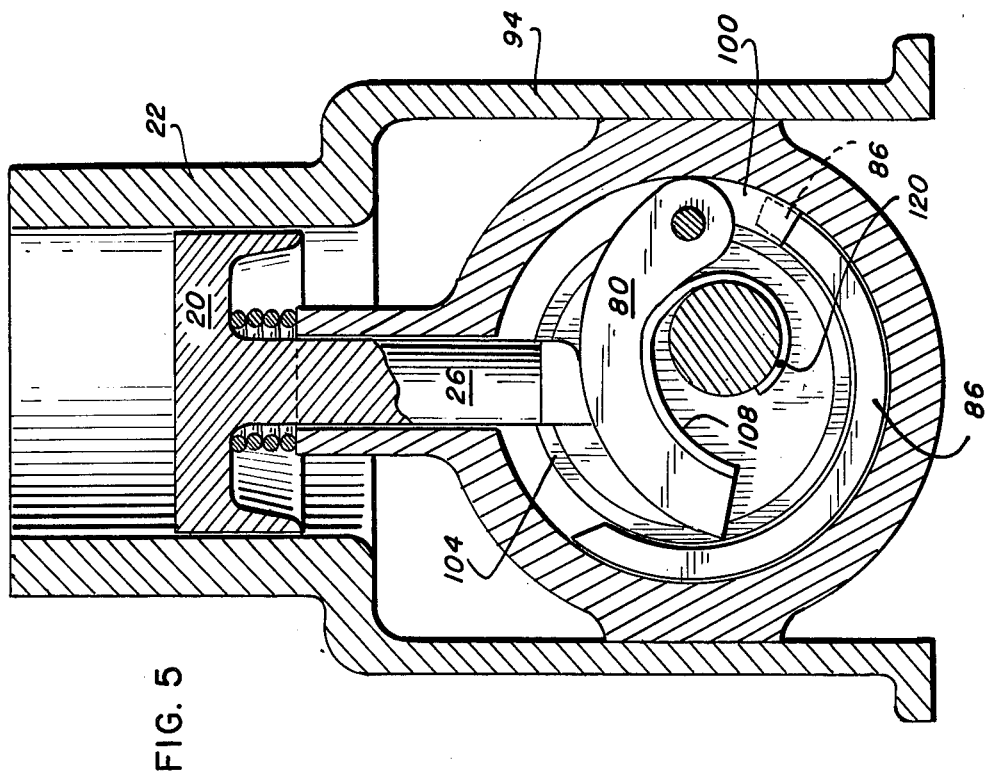
FIGS. 4 through 9 are sectional views similar to FIG. 2, showing various stages of operation, with some parts removed for purposes of clarity and simplicity.

Referring to FIG. 4, the top dead center position, bearing member 80 and eccentric members 84 have rotated in counterclockwise manner for a distance sufficient to place bearing shoe 98 in power-transmitting, sliding contact with bearing member 80.

Upon normal ignition, the centrifugal force holding bearing member 80 in a radially outwardly-pivoted position against cage member 88, plus the bias imparted by spring member 108, can be sufficient to normally prevent displacement of bearing member 80, as energy imparted to the piston by the burning fuel gases is transmitted through bearing member 80 and eccentric member 84 to the crankshaft 86 in the form of torque.

However, as shown in FIG. 4, immediately following the ignition of the fuel gases, the situation is illustrated of enough shock being generated to cause a small amount of displacement of bearing 80, which is shown to be pivoting in counterclockwise manner around pin 82.

It can be seen that bearing 80 came into engagement with shoe 98, and cams 86 cleared shoe 98, prior to top dead center position. Thus, at low speeds, at the end of the compression phase, bearing member 80 may displace slightly by cylinder back pressure to reduce the cylinder compression, as may be desirable. However, at higher speeds, bearing member 80 resists displacement more, and thus the compression is increased. Hence, a variable compression engine can be provided, with, for example, a compression ratio of 8 to 1 at idle and 12 to 1 at high speed.

Figure 5:
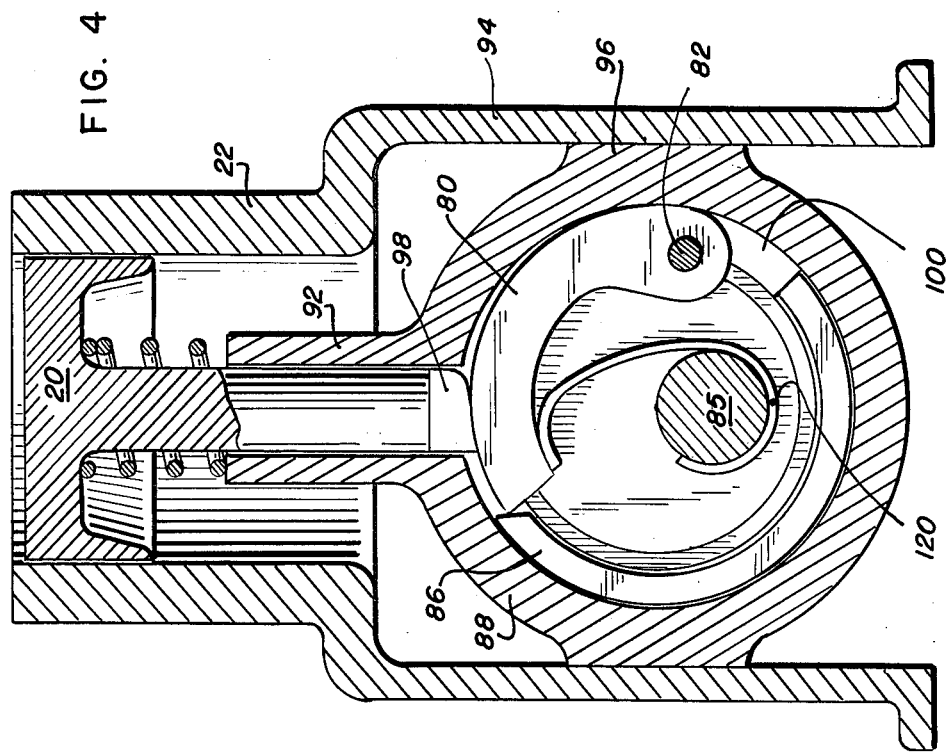

In FIG. 5, the situation is shown where abnormal combustion has taken place, such as detonation and/or whenever combustive pressures are at maximum. Piston 20 and piston rod 26 have retracted, greatly reducing the shock of the normal or abnormal combustion in the cylinder against the system. Bearing member 80 has pivoted counterclockwise, expending energy by compressing spring 108, and by overcoming centrifugal force tending to hold bearing member 80 in its radially outward position.

Figure 6:
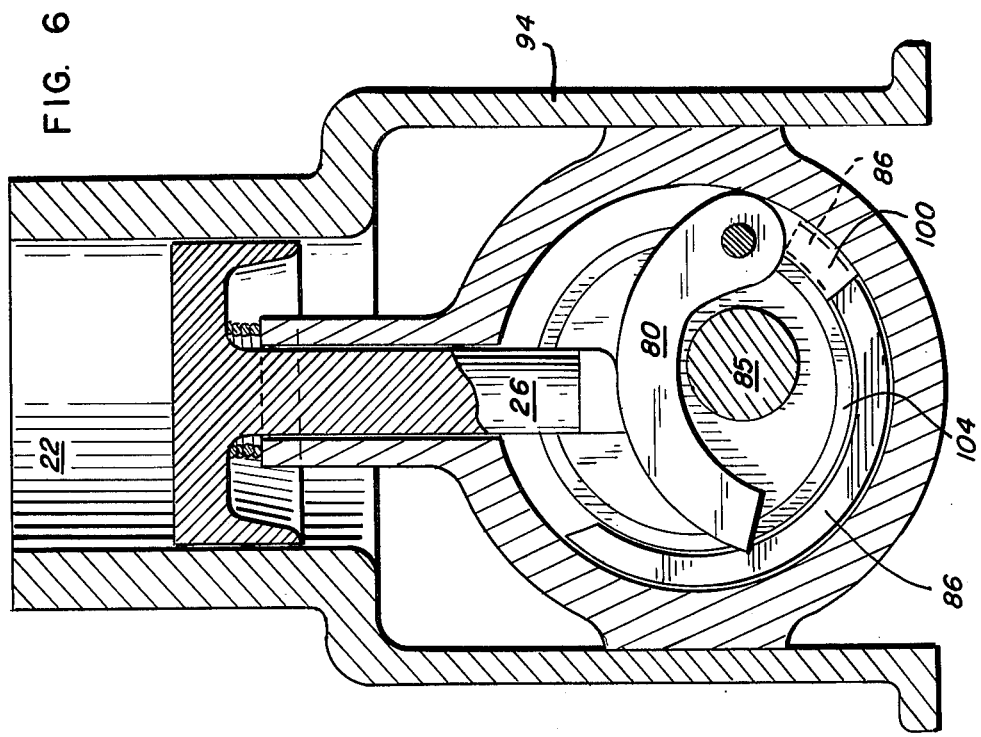

In FIG. 6, as piston rod 26 is driven further downward than in FIG. 5 by the continuing effects of detonation in cylinder 22, ring member 104 is also displaced in clockwise manner against spring 112 (see FIG. 2) for further absorption of energy. As this happens, compression cam 86 can fit into slot 101 of protrusion 100, which is part of ring member 104.

Figure 7:
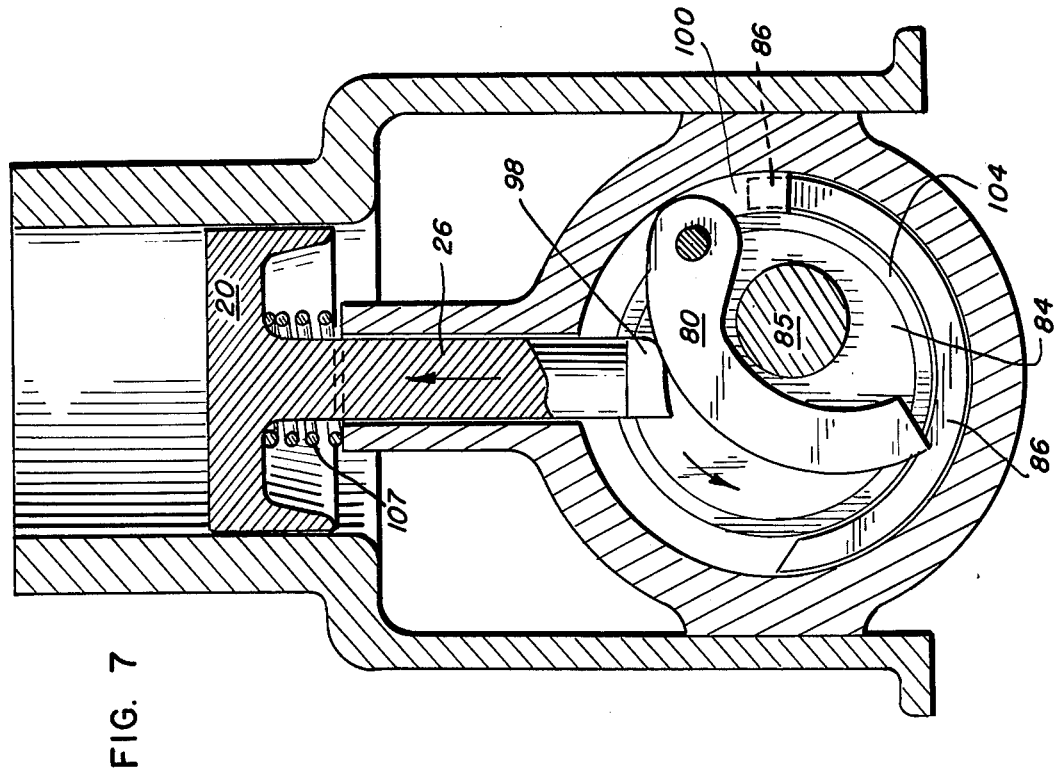

In FIG. 7, further counterclockwise rotation of eccentrically-mounted members 84 and bearing member 80 from the position of FIG. 6 causes piston rod 26 and its piston 20 to to be relatively moved farther away from eccentric member 84, although the piston may not move upwardly in cylinder 22a, since the eccentric member is still rotating downwardly toward bottom dead center position. This motion is of course also assisted by spring 107, plus the urging of outwardly-biased bearing member 80.

Figure 8:
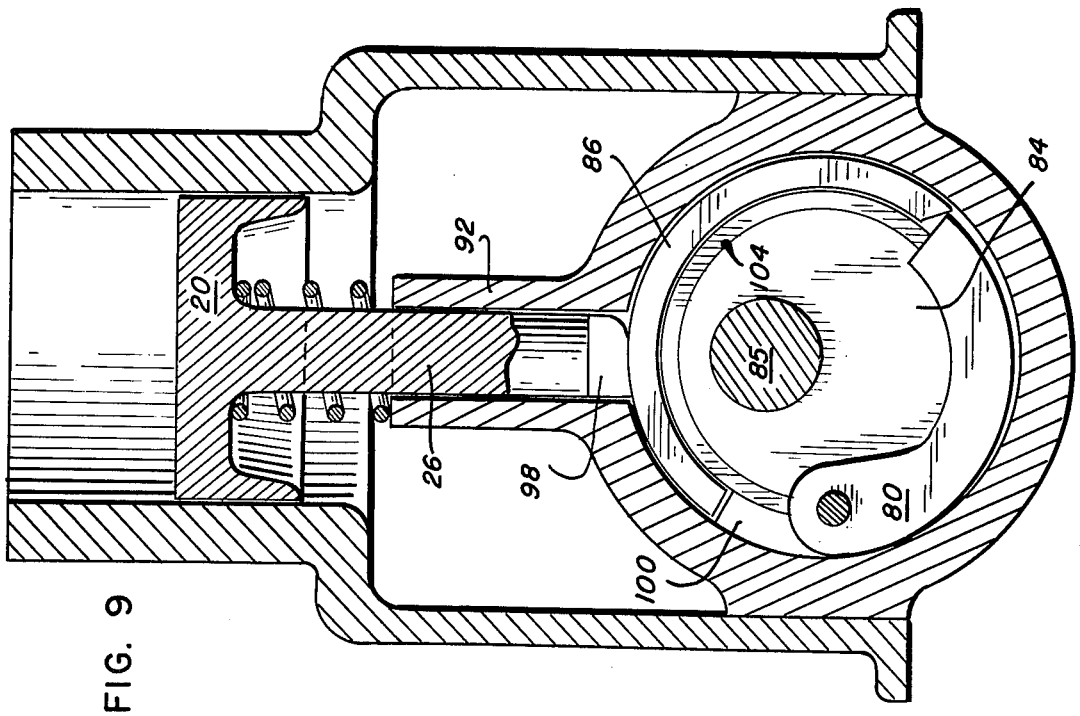

In FIG. 8, while the continued counterclockwise rotation moves eccentric member 84 toward bottom dead center position, piston rod 26 separates from bearing member 80 by the rotation of the system. At this point, bearing shoe 98 of piston rod 26 is in sliding contact with protrusion 100 of ring member 104. Protrusion 100 is positioned between bearing member 80 and compression cam 86, to provide a continuous periphery against which bearing shoe 98 can slide.

Figure 9:
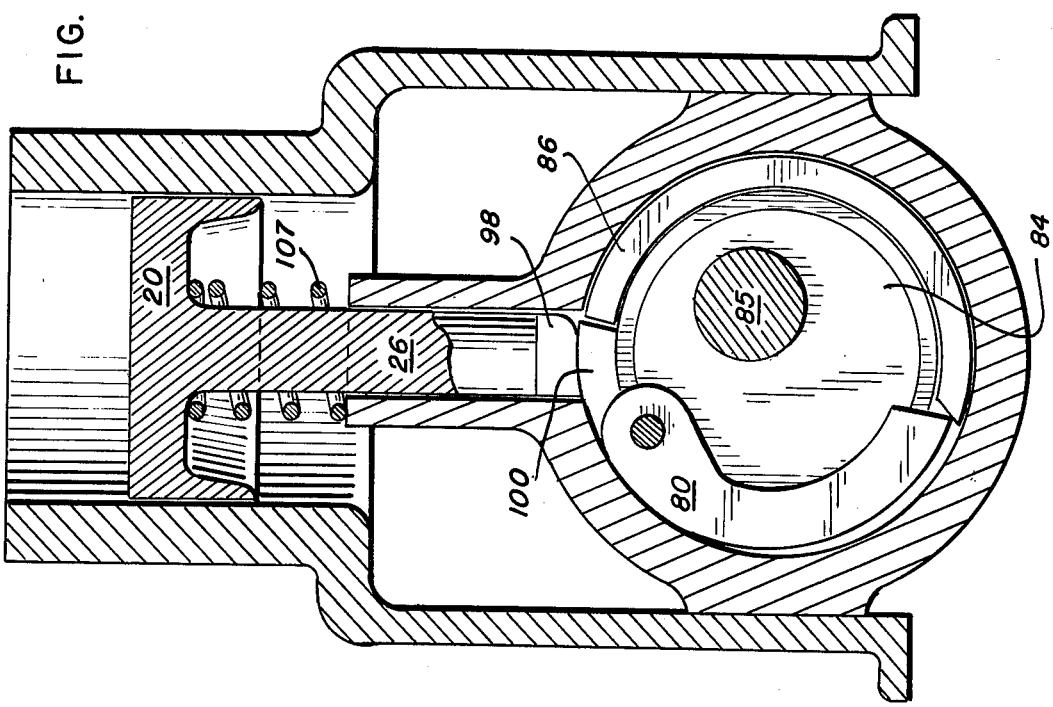

In FIG. 9, eccentric members 84 have rotated to bottom dead center position. In this position, compression cams 86 engage bearing shoe 98, to prevent displacement of piston rod 26 relative to eccentric members 84. In the next 160° of rotation or so, piston 20 and piston rod 26 will be forced upwardly by the compression cams 86, during the rotation of eccentric members 84 in the exhaust stroke, until the piston 20 approaches the top dead center position once again, as previous illustrated.

Thereafter, in the subsequent intake stroke, there will be expected to be no displacement of bearing member 80. However, in the next combustion phase of the cycle, bearing member 80 can displace again, absorbing shock generated in the combustion chamber.

In the compression stroke following the intake stroke, once again compression cams 86 engage shoe 98 of piston rod 26 so that there is no longitudinal resilience In the system as the piston is compressed into the cylinder, throughout most of the compression stroke.

Thereafter, at the end of the compression stroke when the piston reaches the top dead center, or before, compression cams 86 clear shoe 98 to become once again spaced from piston rod 26 so that the system can once again achieve its resilient characteristic by displacement of bearing member 80, during the power phase of the engine cycle.

The above has been offered for illustrative purposes only, and is not intended to limit the invention of this application, which is as defined in the claims below.

That which is claimed is:

1. In an engine having piston means reciprocable in cylinder chamber means, a crankshaft adapted for power-conveying rotation, power-transmitting connection means between said piston means and the crankshaft, and eccentrically-mounted member means mounted on said crankshaft in transverse relation thereto, the improvement comprising, in combination: a bearing member pivotally attached to said eccentrically-mounted member means, said bearing member defining an elongated, curved bearing surface, and positioned for sliding, power-transmitting contact with the power-transmitting connection means, whereby, when shock is generated through said power-transmitting connection means, said bearing member can be displaced by pivotal motion to absorb said shock, said bearing member being adapted to return to its pre-displacement position after absorbing of said shock.

2. The engine of claim 1 in which said bearing member defines an elongated structure, the point of pivotal attachment to said eccentrically-mounted member means being adjacent one end of said bearing member.

3. The engine of claim 2 in which said eccentrically-mounted member also carries compression cam means adapted to periodically engage said power-transmitting connection means as the crankshaft and eccentrically-mounted member rotate, to cause said piston to reciprocate inwardly to reduce the volume of said cylinder chamber means, said cam means being also adapted to be periodically spaced from said connection means, to permit said piston and connection means to displace said bearing member.

4. The engine of claim 3 in which said eccentrically-mounted member defines a face having an annular slot, a ring member rotatably positioned in said slot as part of said eccentrically-mounted member, said bearing member being pivotally attached to said ring member.

5. The engine of claim 4 in which said ring member defines a protrusion positioned between said compression cam and said bearing member, to provide a sliding surface for said power-transmitting connection means therebetween as said crankshaft rotates.

6. The engine of claim 3 in which said eccentrically-mounted member means and said bearing member are enclosed in tubular retainer means and adapted for rotation therein, said tubular retainer means and eccentrically-mounted member means being positioned in generally co-axial relationship, said tubular retainer means further defining a transverse tubular sleeve communicating with the interior of said tubular retainer means, said power-transmitting connection means passing through said transverse tubular sleeve, to be in sliding, power-transmitting, rotational contact with said bearing member and compression cam means.

7. The engine of claim 6 in which said eccentrically-mounted member means is freely rotatably mounted on said crankshaft, whereby said eccentrically-mounted member means, retained by said tubular retainer means, moves in counter-rotating relationship with said crankshaft as the engine operates.

8. The engine of claim 7 in which spring means is positioned to resiliently bias said piston means outwardly from said tubular retainer means and transverse tubular sleeve.

9. The engine of claim 8 in which said bearing member is positioned between a pair of said eccentrically-mounted members, each carrying a said compression cam, said pair of members and bearing member being positioned within said tubular retainer means.

10. The engine of claim 9 in which a spring member urges said bearing member into its radially outward-most pivoting position.

11. In an engine having piston means reciprocable in cylinder chamber means; a crankshaft adapted for power conveying rotation; power-transmitting connection means between said piston means and the crankshaft, and eccentrically-mounted member means mounted on said crankshaft in transverse relation thereto, the improvement comprising, in combination: a bearing member attached to said eccentrically-mounted member means, said bearing member defining an elongated, curved bearing surface, and positioned for sliding, power-transmitting contact with the power-transmitting connection means whereby, when shock is generated through said power-transmitting connection means, said bearing member can be displaced by pivotal motion to absorb said shock, said bearing member being adapted to return to its pre-displacedment position after absorbing of said shock, and spring means positioned adjacent said piston to resiliently bias said piston means away from said bearing member.

12. In an engine having piston means reciprocable in cylinder chamber means; a crankshaft adapted for power-conveying rotation; power-transmitting connection means between said piston means and the crankshaft, and eccentrically-mounted member means mounted on said crankshaft in transverse relation thereto, the improvement comprising, in combination: a bearing member carried by said eccentrically-mounted member means, said bearing member defining an elongated, curved bearing surface, and positioned for sliding, power-transmitting contact with the power-transmitting connection means, whereby, when shock is generated to said power-transmitting connection means, said bearing member can be displaced to absorb said shock; means for biasing said bearing member into its pre-displacement position to cause its return after absorbing of said shock; said eccentrically-mounted member means and said bearing member being enclosed in tubular retainer means and capable of rotation therein, said tubular retainer means and eccentrically-mounted member means being positioned in generally co-axial relationship, said tubular retainer means being adapted for co-linear, reciprocating motion with said piston means and said connection means, and further defining a transverse tubular sleeve communicating with the interior of said tubular retainer means, said power-transmitting connection means passing through said transverse tubular sleeve for sliding, power-transmitting contact with said bearing member; said eccentrically-mounted member means being freely rotatably mounted on said crankshaft, whereby said eccentrically-mounted member means, retained by said tubular retainer means, moves in counterrotating relationship with said crankshaft as the engine operates.

13. The engine of claim 12 in which said eccentrically-mounted member means also carries compression cam means adapted to periodically engage said power-transmitting connection means as the crankshaft and eccentrically-mounted member rotate, to cause said piston to reciprocate inwardly to reduce the volume of said cylinder chamber means, said cam means being also adapted to be periodically spaced from said connection means, to permit said piston and connection means to displace said bearing member.

14. The engine of claim 13 in which said bearing member is positioned between a pair of said eccentrically-mounted members, each carrying a said compression cam, said pair of members and bearing member being positioned within said tubular retainer means.

15. The engine of claim 14 in which a spring member urges said bearing member into its radially outward-most pivoting position.

16. The engine of claim 15 in which said bearing member defines an elongated, curved structure which is pivotally attached adjacent one end thereof to eccentrically-mounted members.

* * * * *